(12) United States Patent
Zhou (10) Patent No.: US 10,107,641 B2
(45) Date of Patent: Oct. 23, 2018

(54) LINEAR VISUALIZATION OF A DRIVING ROUTE

(71) Applicant: GOOGLE INC., Mountain View, CA (US)

(72) Inventor: Bailiang Zhou, Seattle, WA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 15/346,223

(22) Filed: Nov. 8, 2016

(65) Prior Publication Data
US 2018/0128636 A1    May 10, 2018

(51) Int. Cl.
| | | |
|---|---|---|
| *G01C 21/36* | (2006.01) | |
| *G01C 21/20* | (2006.01) | |
| *H04W 4/02* | (2018.01) | |

(52) U.S. Cl.
CPC ......... *G01C 21/3676* (2013.01); *G01C 21/20* (2013.01); *G01C 21/3605* (2013.01); *G01C 21/3632* (2013.01); *G01C 21/3673* (2013.01); *H04W 4/023* (2013.01); *H04W 4/025* (2013.01)

(58) Field of Classification Search
CPC .... G01C 21/3676; G01C 21/20; H04W 4/023
See application file for complete search history.

(56) References Cited

U.S. PATENT DOCUMENTS

| | | |
|---|---|---|
| 2016/0123761 A1 | 5/2016 | Van Wieringen et al. |
| 2016/0290819 A1 | 10/2016 | Kalyanaraman et al. |
| 2017/0120807 A1* | 5/2017 | Kalyanaraman ....... B60Q 1/346 |

FOREIGN PATENT DOCUMENTS

| | | |
|---|---|---|
| EP | 1 865 284 A1 | 12/2007 |
| WO | WO-2008/041316 A1 | 4/2008 |
| WO | WO-2017/079364 A1 | 5/2017 |

OTHER PUBLICATIONS

Agrawala et al., "Rendering Effective Route Maps: Improving Usability Through Generalization," *Siggraph 2001*, Computer Graphics Laboratory, Stanford University, Stanford, California, 2001.

(Continued)

*Primary Examiner* — Basil T. Jos
(74) *Attorney, Agent, or Firm* — Marshall Gerstein & Borun LLP (57) ABSTRACT

A nonlinear route for traveling from a source to a destination is determined. The route includes a sequence of (i) route segments and (ii) intermediate geographic locations defining endpoints of the route segments. An initial linear visual representation of the route is generated and displayed via a user interface of a computing device. To generate the initial linear visual representation of the route, an initial subset of the intermediate geographic locations is selected. The initial subset does not include at least of the intermediate geographic locations in the sequence. Indicators of the intermediate geographic locations are positioned along a single line, and an interactive control is provided. When activated, the interactive control generates an expanded linear visual representation of the route. The expanded linear visual representation includes at least one of the intermediate geographic locations not selected for the initial linear visual representation.

20 Claims, 10 Drawing Sheets

(56) References Cited

OTHER PUBLICATIONS

"Something About Maps," https://somethingaboutmaps.wordpress.com/2011/03/08/remembering-linedrive/, Mar. 8, 2011, retrieved from the Internet on Nov. 7, 2016.
Underground Map, Transport for London, Jun., 2016, http://files.londonandpartners.com/assets/pdf/tube_map_june_2016.pdf, retrieved from the Internet Nov. 7, 2016.
Digital screenshot of Google Maps navigation application on a smartphone, retrieved Nov. 7, 2016.
Combined Search and Examination Report for Application No. GB1717720.5, dated Mar. 28, 2018.
International Search Report and Written Opinion for Application No. PCT/US2017/056258, dated Mar. 22, 2018.

* cited by examiner

ID OF THE DISCLOSURE

LINEAR VISUALIZATION OF A DRIVING ROUTE

FIELD OF THE DISCLOSURE

The following disclosure generally relates to a system and method for presenting driving directions to a user and, in particular, to an interactive linear representation of a route.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Today, navigation systems that provide driving directions to users are available as dedicated devices and are accessible via personal computers as well as various portable devices. These navigation systems typically determine a route to a destination and provide a sequence of driving instructions for the determined route, such as "turn left on Main Street" or "drive north for two miles." Navigation systems also can illustrate navigation routes on digital maps by visually emphasizing the road segments that make up the route, for example. These illustrations reflect the actual geometry of the routes but do not offer intuitive and efficient interactivity.

SUMMARY

A navigation system generates an interactive linear visual representation, or "visualization," of a navigation route having non-linear geometry. The linear visualization can include a depiction of the navigation route from an origin to a destination as a line, thereby reducing the amount of screen real estate required to depict the navigation route. Indications of geographic location at which segments of the navigation route meet can be disposed on or along the line. Initially, the linear visualization can include only some of the route segments and the indications of corresponding geographic locations, so as to provide a simplified view of the navigation route. Further, the navigation system can include controls for selectively expanding portions of the linear visualization to view additional, typically more minor, route segments and geographic locations.

One example embodiment of these techniques is a method for generating interactive representations of navigation routes. The method includes determining, by one or more processors, a nonlinear route for traveling from a source to a destination. The route includes a sequence of (i) route segments and (ii) intermediate geographic locations defining endpoints of the route segments. The method also includes generating, by one or more processors, an initial linear visual representation of the route and displaying the linear representation of the route via a user interface of a computing device. More particularly, generating the initial linear visual representation of the route includes selecting an initial subset of the intermediate geographic locations, the initial subset not including at least of the intermediate geographic locations in the sequence, positioning indicators of the intermediate geographic locations along a single line, and providing an interactive control which, when activated, generates an expanded linear visual representation of the route. The expanded linear visual representation includes at least one of the intermediate geographic locations not selected for the initial linear visual representation.

Another example embodiment of these techniques is a portable computing device including a user interface and processing hardware. The processing hardware is configured to: obtain a nonlinear route for traveling from a source to a destination, the route including a sequence of (i) route segments and (ii) intermediate geographic locations defining endpoints of the route segments; position indicators of the intermediate geographic locations along a single line; provide an interactive control which, when activated, generates an expanded linear visual representation of the route, such that the expanded linear visual representation includes at least one of the intermediate geographic locations not selected for the initial linear visual representation; and display the linear representation of the route via the user interface.

Yet another example embodiment of these techniques is a non-transitory computer-readable memory storing thereon instructions. When executed by one or more processors, the instructions cause the one or more processors to obtain a nonlinear route for traveling from a source to a destination, the route including a sequence of (i) route segments and (ii) intermediate geographic locations defining endpoints of the route segments; select a first subset of the intermediate geographic locations, the first subset not including at least of the intermediate geographic locations in the sequence; generate an initial linear visual representation of the route to depict the first subset of the intermediate geographic locations, including position indicators of the intermediate geographic locations in the first subset along a single line; select a second subset of the intermediate geographic locations, the second subset including at least one intermediate geographic location not included in the first subset; and generate an updated linear visual representation of the route to depict the second subset of the intermediate geographic locations, including position indicators of the intermediate geographic locations in the second subset along the single line

DETAILED DESCRIPTION

Overview

A navigation system of this disclosure generates an interactive linear visualization of a navigation route that has nonlinear geometry. More particularly, the navigation route can include multiple route segments between pairs of intermediate geographic locations, which also can be referred to as "waypoints." When arranged sequentially, these route segments make up a polyline. The navigation system of this disclosure reduces the geometric complexity of the polyline to reduce the amount of screen real estate required to display the navigation route and to improve the overall efficiency of presenting navigation directions to a user, as discussed below.

In an example scenario, user Alice requests driving directions from her home to a place with which she is generally unfamiliar. The navigation system determines a navigation route that includes a sequence of eight route segments. The first three segments connect Alice's home to a highway: (1) 0.1 miles down Maple to the intersection of Maple and Main, (2) 1.2 miles down Main to the ramp of I-90, and (3) 0.1 miles along the ramp to I-90. The navigation system also can generate corresponding navigation directions describing the route segments and/or maneuvers at waypoints: "head north on Maple," "turn right onto Main," "take Main east for 0.6 miles," "use the right lane to get on I-90." The next two segments connect the entrance of the highway to an exit from another highway: (4) 10 miles west on I-90, then (5) 2 miles south on I-91. The last three segments connect the exit from the highway to Alice's destination: (6) 2.2 miles down State St. to the intersection of State and Elm, (7) 0.3 miles east down Elm to the intersection of Elm and Lake, and (8) 0.1 miles down Lake.

To generate a linear visualization of the navigation route described above, the navigation system can reduce the complexity of the polyline defined by the navigation and present some or all of the waypoints on or along a depiction of a straight line. Depending on the implementation, the distances between waypoints along the straight line can be equal, proportional to the distances between the waypoints along the polyline, or illustrative of the differences between the distances between the waypoints along the polyline without being directly proportional, etc. As a more specific example of the latter implementation, the first segment between Alice's home and the intersection of Maple and Main is approximately twelve times shorter than the next segment between the intersection of Maple and Main and the ramp of I-90, but the navigation system can place the "home" and "Maple/Main" waypoints N units apart and the "Maple/Main" and "I-90 entrance" waypoints 3N units apart on the line. In this manner, the linear visualization can convey the difference in distances while efficiently utilizing screen real estate.

In one example implementation, the navigation system initially can generate a linear visualization that includes only some of the waypoints, and accordingly merges multiple route segments into a common line segment, so as to further simplify the presentation of the navigation route. The waypoints in this initial set can be the "major" locations such as significant intersections, freeway interchanges, prominent landmarks, etc. The navigation system can omit from the initial linear visualization the more "minor" locations such as intersections between smaller streets or less prominent landmarks. The navigation system also can consider relative distances of route segments to assess potential importance. Moreover, in some implementations, the navigation system can assess the degree of user's familiarity with portions of the navigation route based on explicitly set "home" and "work" locations, previously visited locations or previously submitted navigation queries, etc. and omit otherwise important waypoints and the corresponding route segments because the user is unlikely to require guidance for these parts of the journey. In some implementations, users operate certain controls or install certain applications to allow the navigation system to consider the user's previously visited locations in assisting the user in navigation.

Referring again to the scenario involving Alice, the navigation system can determine that the first and second route segments are near Alice's home. Accordingly, the navigation system can omit the waypoint "intersection of Maple and Main" between segments (1) and (2). To continue with this example, the navigation system can determine that the route segments (3) and (4) correspond to different road types. To this end, the navigation system can query a map database to compare speed limit data (e.g., "20 mph in segment (3) and 65 mph in segment (4)), compare the number of lanes, etc. The navigation system thus can determine that the waypoint between segments (3) and (4) is major. Further, the navigation system can determine that segments (4) and (5) correspond to similar types of roads, segments (5) and (6) correspond to different types of roads, and segments (6)-(8) correspond to similar types of roads. Still further, the navigation system can determine that the user is probably unfamiliar with the geographic area segments (6)-(8) traverse. In view of these factors, the navigation system can include in the initial linear visualization the waypoints connecting segments (3) and (4), (5) and (6), (6) and (7), and (7) and (8).

The linear visualization can include interactive controls to allow the user to inspect route segments and waypoints omitted from the initial linear visualization. The interactive controls may be buttons, icons, portions of the line on which the waypoints are disposed, voice controls, etc. These or other controls also can allow the user to collapse route segments to reduce the amount of detail. In the example scenario above, the navigation system in response to a user command can expand the section between the "home" and "I-90 entrance" to view route segments (1), (2) and (3). The navigation system thus can allow the user to "drill down" into the navigation route" to view details at particular portions of the linear visualization. The navigation system in some cases also can allow the user to expand the visible portions of the linear visualization at multiple levels.

The navigation system can represent waypoints on the line using interactive icons. In one example implementation, the icons represent the type of geographic feature disposed at the corresponding geographic location: a bridge, a tower, a temple, etc. The linear visualization also may include an icon representing the current location of the user along the navigation route. As the user advances along the navigation route, the icon can advance along the linear visualization accordingly. As the user icon advances, the navigation system can collapse, change the size or emphasis, or entirely remove one or more route segments that the user icon has passed.

The linear visualization of the navigation route further can include driving instructions for the proximal maneuver to transition from one route segment to another. For example, a text or image indicating the next immediate driving instruction and/or location can be persistent across expansion and/or collapse operations by a user.

Also, the navigation system in some implementations can depict map features on or next to the linear visualization of the navigation route. The positioning of these map features relative to the linear visualization or each other need not correspond precisely to real-world geometry. For example, a portion of a lake can be schematically depicted next to a waypoint to illustrate general proximity of the feature of the waypoint, without conveying the precise direction or distance.

As discussed below, the navigation system can implement various additional features to provide a linear visualization of a navigation route. For example, the linear visualization can appear to be disposed on a plane tilted relative to the plane of the user interface screen, so that the more proximate waypoints appear closer than the more distant ones. The more proximate portions of the linear visualization also can be darker than the more distant ones, to better convey the sense of perspective. Further, the navigation system can include indications of traffic in the linear visualization. For example, one segment of the line can appear in red to indicate heavy traffic, another segment can appear in orange to indicate lighter traffic, etc.

The navigation system can be implemented in one or more network servers and/or a client device. For example, a client device in one implementation receives a description of a nonlinear route from a network server and generates a linear visualization locally. The client device in general can be a computing device such as a desktop or laptop computer, a portable computing device such as a smartphone, a wearable computing device such as a smartwatch, a dedicated navigation device such as a navigation system built into a vehicle or mounted in a vehicle, etc. The client device in some implementations also can project the linear visualization onto a separate display device such as a screen in the head unit of a vehicle.

For ease of explanation, the examples below refer to driving routes. However, the linear visualization techniques of this disclosure also can be applied to walking routes or biking routes, for example.

Further, although the examples below focus on the linear implementation, in other implementations a navigation system can similarly position indications of waypoints and/or route segments along an arc, for example. More particularly, to display a navigation route on a round-faced smartwatch, for example, the navigation system can reduce the complexity of a polyline to map the vertices onto a circle.

Next, these techniques are discussed in more detail below with reference to FIGS. 1-10. In particular, embodiments of an example system in which a navigation system can generate an interactive linear visualization of a navigation route are described with reference to FIG. 1, example user interfaces including a linear visualization of a navigation route are described with reference to FIGS. 2-9B, and an example method for generating a linear visualization of a navigation route is discussed with reference to FIG. 10.

Example Computing System

Figure 1:
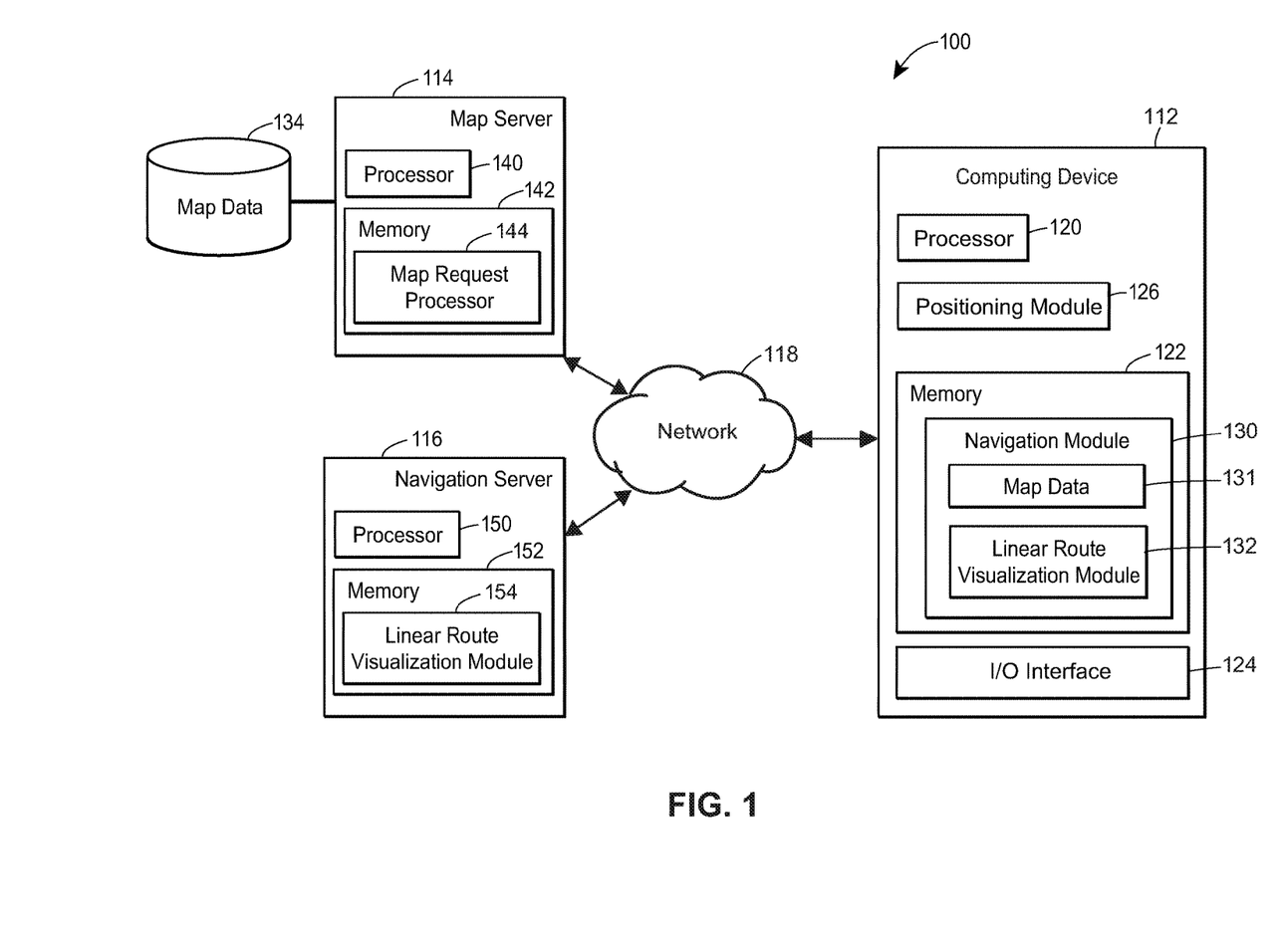
FIG. 1 is a block diagram of an example system in which techniques for presenting a linear visualization of a driving route may be implemented.

Referring first to FIG. 1, an example system 100 includes a computing device 112 coupled to a map server 114 and a navigation server 116 via a communication network 118. The computing device 112 can be a laptop computer, a desktop computer, a tablet computer, a smartphone, a navigation device mounted in a vehicle, or another suitable device. The network 118 in general can include one or more wired and/or wireless communication links and may include, for example, a wide area network (WAN) such as the Internet, a local area network (LAN), a cellular telephone network, or another suitable type of network.

The computing device 112 can include one or more processors 120, a computer-readable memory 122, one or more input/output (I/O) interfaces 124, and a positioning module 126. In various implementations, the computing device 112 can include additional components, such as one or more wired and/or wireless network interfaces, peripheral devices such as a mouse, etc.

The I/O interface 124 can include a touchpad over which the user moves his fingers while looking at a separately provided screen, a touchscreen where the user places his fingers directly over the image being manipulated or over a displayed control being activated (e.g. a displayed keyboard), a keyboard, a mouse, etc. In some implementations or scenarios, the computing device 112 receives input and provides output via external devices such as the touchscreen embedded in the head unit of a vehicle, for example.

The processor 120 can include a central processing unit (CPU). More generally, the computing device 112 can include one or more processors and, if desired, one or more graphics processing units (GPUs) as well as other processing units. The memory 122 can be a computer-readable non-transitory storage device that may include both persistent (e.g., a hard disk, a flash drive) and non-persistent (e.g., RAM) memory components. The memory 122 also can store instructions that implement a navigation module 130, which in turn can include a linear route visualization module 132. The navigation module 130 can operate as a component of a dedicated navigation and/or mapping application or an API or plugin in a third-party application such as a web browser, for example. In operation, the navigation module 130 can use map data 131 that can include a description of a nonlinear route, definitions of map features in a vector-based or rasterized format, descriptions of geo-located businesses, etc. The navigation module 130 can receive the map data 131 from the map server 114 and the navigation server 116.

With continued reference to FIG. 1, the map server 134 can include one or more processors 140 and one or more memories 142 storing instructions that implement a map request processor 144. The map server 114 can be communicatively coupled a map database 134. Similarly, the navigation server 116 can include one or more processors 150 and one or more memories 152. The memory modules 142 and 152 can be non-transitory storage devices including persistent (e.g., a hard disk, a flash drive) and/or non-persistent (e.g., RAM) memory components. The memory 152 can store instructions executable on the processor(s) 150 that make up linear route visualization module 154. In some implementations, the linear route visualization module 154 executes some of the functions related to generating linear visualizations of navigation routes (e.g., polyline simplification) while the linear route visualization module 132 implements other functions (e.g., waypoint selection and rendering). More generally, however, the functionality of generating linear visualization of navigation routes can be distributed between the modules 132 and 154 in any desired manner, including implementing the entire functionality in only the module 132 or only the module 154.

The map server 114, the navigation server 116, and the navigation module 130 can operate as components of a navigation system of this disclosure. Because the various functions of the navigation system can be distributed among these and other components in any suitable manner, actions performed by the navigation system can be actions performed individually by one of these components or collectively by groups of two or more of these components.

In operation, a user of the computing device 112 can request, via the I/O interface 124, navigation directions from a point of origin, which implicitly can correspond to the user's current location, to a destination. The linear route visualization module 132 can receive map data 131 from the map server 114 via the network 118, or use pre-stored map data 131. After obtaining the map data, the linear route visualization module 132 can generate the linear visualization of the navigation route and present the interactive linear visualization via the I/O interface 124 of the computing device 112.

In another implementation, the navigation module 130 can transmit a request for data specifically for generating a linear visualization of a navigation to the navigation server 116. The linear route visualization module 154 in response can generate the linear visualization of the navigation route, which may include requesting and retrieving at least some map data 134 from the map server 114 via the network 118. The linear visualization of the navigation route can include indications of intermediate geographic locations to be presented on or along a depiction of a line, one or more images to be included in the visualization, one or more driving instructions, etc. The navigation server 116 can transmit the linear visualization of the navigation route to the computing device 112, and the navigation module 130 can present the interactive linear visualization of the route via the I/O interface 124.

After providing the initial linear visualization of the navigation route, the navigation module 130 can modify the entire linear visualization or a selected portion of the linear visualization in response to user input. Examples of user input include gestures applied to a touchscreen, button presses, mouse clicks, voice commands, etc.

Further, the navigation module 130 can automatically update the linear visualization of the navigation route in response to a change of location on the part of the computing device 112. For example, the navigation module 130 may update the linear visualization to show advancement of the computing device 112 along the navigation route, or to show that the computing device 112 has deviated from the navigation route.

For simplicity, FIG. 1 illustrates each of the map server 114 and the navigation server 116 as only one instance of a server device. However, according to some implementations, the map server 114 and/or the navigation server 116 can include a group of one or more server devices, each equipped with one or more processors and capable of operating independently of the other server devices. For example, map server devices operating in such a group can process requests from the computing device 112 individually (e.g., based on availability), in a distributed manner where one operation associated with processing a request is performed on one map server device while another operation associated with processing the same request is performed on another map server device, or according to any other suitable technique. Further, the map server and navigation server may be separate server devices, or at least some of the functions of each may be included in one or more integral server devices.

Example User Interface Screens Related to Interactive Linear Visualization of a Navigation Route Next, FIGS. 2-9 illustrate several example user interface screens the linear route visualization modules 132 and/or 154 can generate for presentation via the user interface of the client device 112. Although these screens are illustrated in the vertical orientation of a smartphone, similar screens can be generated for the horizontal orientation of the smartphone as well as for vertical and horizontal orientations of other devices, including devices with round or other non-standard screens.

Figure 2:
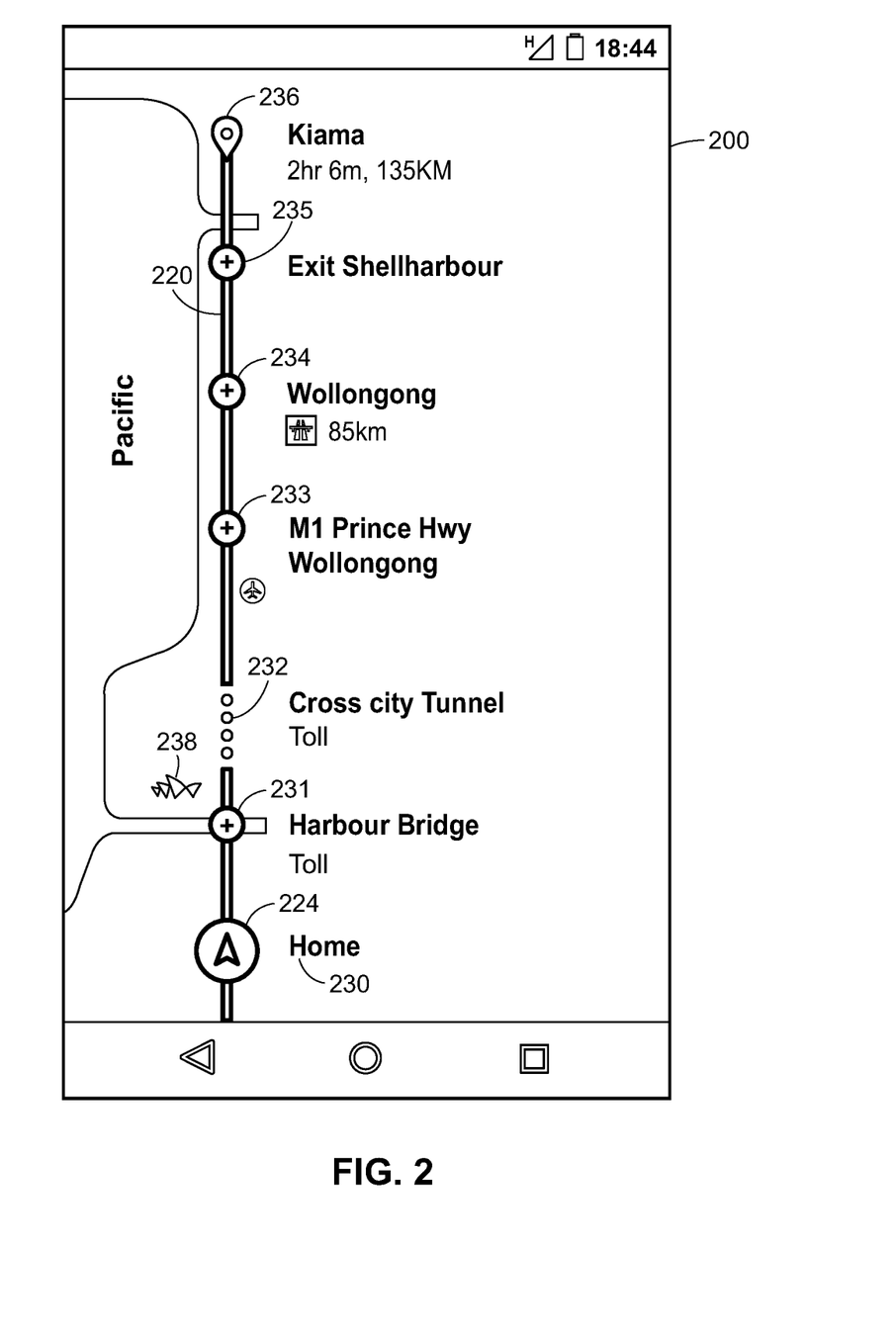
FIG. 2 is an example user interface screen depicting an interactive linear visualization of a navigation route, which the computing device of FIG. 1 can generate.

Referring first to FIG. 2, an example user interface screen 200 depicts an initial linear visualization of navigation route from an origin (home) to a destination (Kiama). The screen 200 illustrates a sequence of route segments arranged on a line 220. The visualization modules 132 and/or 154 can place on the line 220 an origin indicator 230, a destination indicator 236, intermediate geographic location or waypoint indicators 231-235 at the endpoints of the route segments, and a current location indicator 224 in accordance with the current location of the client device 112. As the user travels along the navigation route, the current location indicator 224 appears to advance along the line 220 to reflect the change in the user's current location.

Some or all of the waypoint indicators 231-235 can be interactive icons. In the example implementation of FIG. 2, the icons include a certain symbol to indicate that the presentation of one or both route segments connected at the waypoint can be expanded into a presentation of the component route segments. In another implementation, the waypoint indicators 231-235 include icons that convey additional information about the corresponding geographic locations. For example, the waypoint indicator 231 can include an icon for a bridge, the waypoint indicator 231 can include an icon for a highway, etc. In yet other implementations, the waypoint indicators 231-235 can include representative photographs of the corresponding geographic locations, other graphics, text, etc.

The distances between the waypoint indicators 231-235 along the line 220 in one implementation are equal and independent of the corresponding real-world distances. In another implementation, however, the visualization modules 132 and/or 154 place the waypoint indicators 231-235 along the line 220 at distances that are in approximate proportion to the real-world distances. In yet another implementation, the visualization modules 132 and/or 154 place the waypoint indicators 231-235 along the line 220 at distances selected in view of the real-world distances but not necessarily in direct proportion to these distances. Still another implementation of the linear visualization is where the waypoint indicators corresponding to the locations distant from the current location are spaced closer apart, while the waypoint indicators corresponding to the more proximate locations are spaced farther apart.

Depending on the implementation, the waypoint indicators 231-235 can be selectable via a tap, a double tap, a mouse click, etc. Additionally or alternatively, the segments of the line 200 between pairs of the waypoint indicators 231-235 can be individually selectable via the user interface. Thus, in one such implementation, the segment between the waypoint indicators 233 and 234 for example can be selectable via a double tap applied directly to the segment. Selection and expansion of segments of the line 220 are discussed in more detail below with reference to FIGS. 4 and 5.

As further illustrated in FIG. 2, the screen 200 also can include one or more scenery elements or other map features that may provide additional context for the linear visualization of the navigation route. For example, the approximate coastline of the Pacific Ocean in this example can inform the user that he or she will pass next to body of water at the intermediate geographic location corresponding to the waypoint indicator 231. Further, the position the approximate coastline and the label with respect to the line 220 can inform the user that the Pacific Ocean is generally on the left relative to the direction of travel. The visualization modules 132 and/or 154 can reduce the complexity of coastline geometry using a suitable polyline decimation algorithm such as the Ramer-Douglas-Peucker algorithm, for example, so as to make the presentation of this feature more schematic.

The screen 200 also can include additional map features such as a schematic representation 238 of a prominent landmark (in this case, Sydney Opera House). The locations of these map features relative to each other and the line 220 need not precisely correspond to the real-world locations. Rather, the visualization modules 132 and/or 154 can place these map features on the screen 200 to illustrate the approximate positioning of these map features relative to the waypoints.

Figure 3:
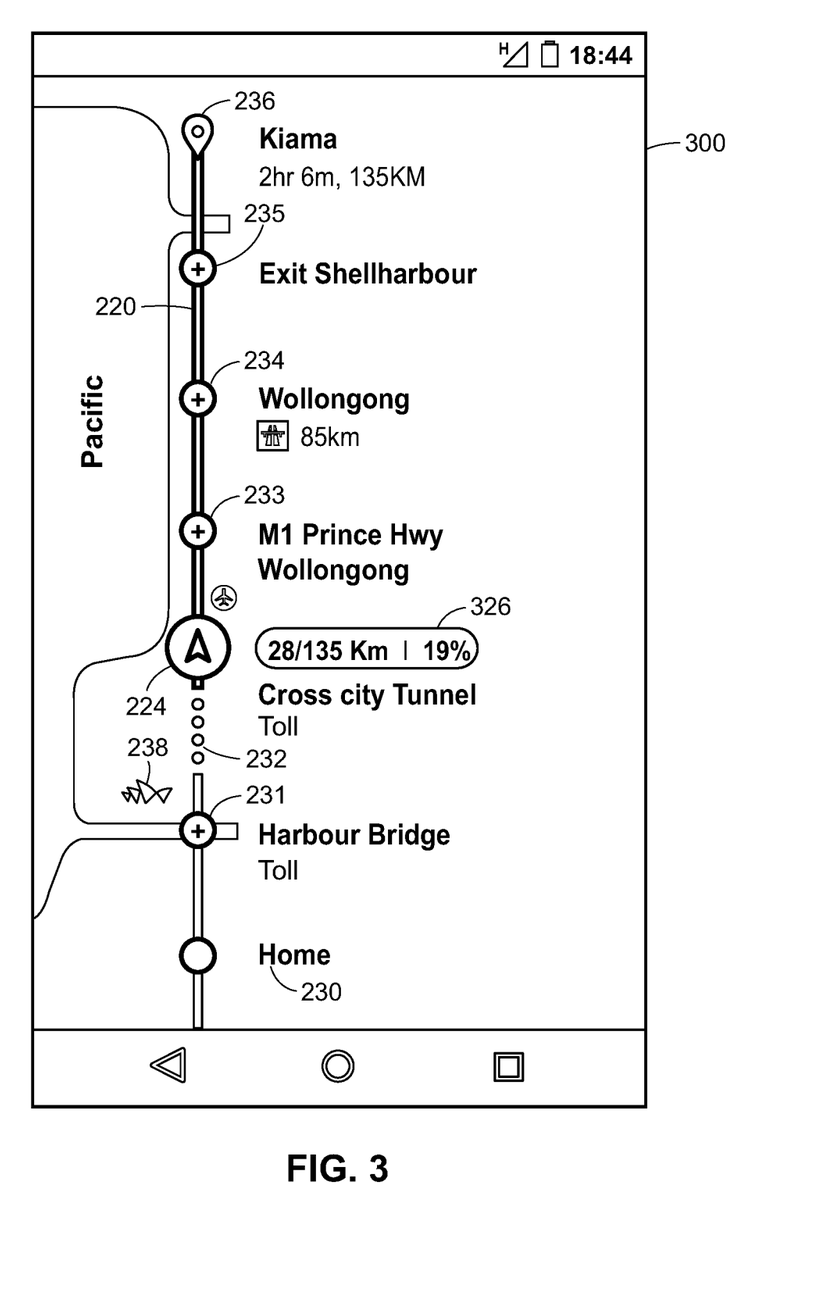
FIG. 3 is an example user interface screen the computing device of FIG. 1 can generate to illustrate progress the navigation route of FIG. 2.

Next, FIG. 3 illustrates an example user interface screen 300 in which the initial interactive linear visualization of FIG. 2 is updated to illustrate progress of the computing device 112 along the navigation route. In this scenario, the computing device 112 has advanced past Cross city Tunnel, as indicated by the current location indicator 224. In addition to depicting the current location indicator 224 at a new position along the line 220, the example screen 300 includes a progress indicator 326 that indicates such information as distance traveled, distance remaining to travel, the total length of the navigation route, the percentage of the navigation route already traveled, etc.

In one implementation, a user can manually advance the current location indicator 224 along the line 220 using an appropriate gesture, for example. As a more specific example, the user may wish to know the percentage of travel that will have been completed once the user reaches the intermediate geographic location corresponding to the waypoint indicator. Using the appropriate interactive control, the user can temporarily reposition the current location indicator 224 to the intermediate geographic location 235, and the progress indicator 326 is automatically updated to display new progress information. The linear route visualization modules 132 and/or 154 then can automatically restore the current location indicator 224 to the position along the line 220 that reflects the actual current location of the computing device 112.

Figure 4:
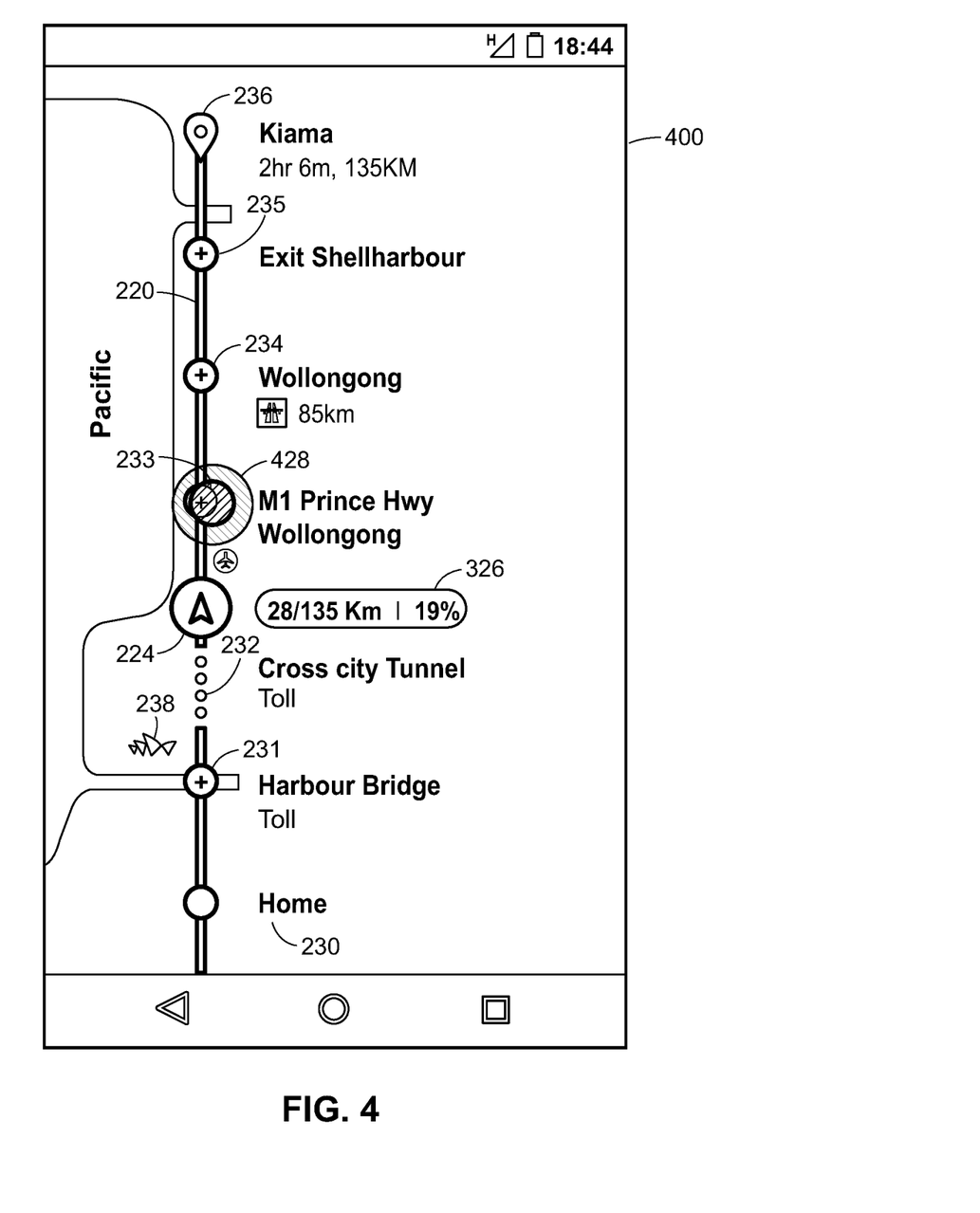
FIG. 4 schematically illustrates user activation of an interactive control that can be provided as part of the interactive linear visualization of FIGS. 2 and 3.

FIG. 4 now schematically illustrates user activation of an interactive control on an example user interface screen 400, which is similar to the screen 300 discussed above. The shaded area 428 in FIG. 4 schematically illustrates the area of contact with the user's finger when the user taps, double-taps, or applies another gesture to the user interface. The user in this example scenario operates on the interactive waypoint indicator 233.

Depending on the implementation, actuating an interactive waypoint indicator such as the waypoint indicator 233 triggers the expansion of the entire initial linear visualization or only a portion of the initial linear visualization (e.g., the two segments of the lined 220 that connect the waypoint indicator 233). In one example implementation, actuating any of the waypoint indicators visible on the screen results in the expansion of the entire linear visualization, at least to the next level of specificity; on the other hand, clicking, tapping or otherwise selecting a segment of the line 220 between two waypoint indicators results in the expansion of only this segment. Thus, the user choose to expand the entire linear visualization or only the desired portion.

Figure 5:
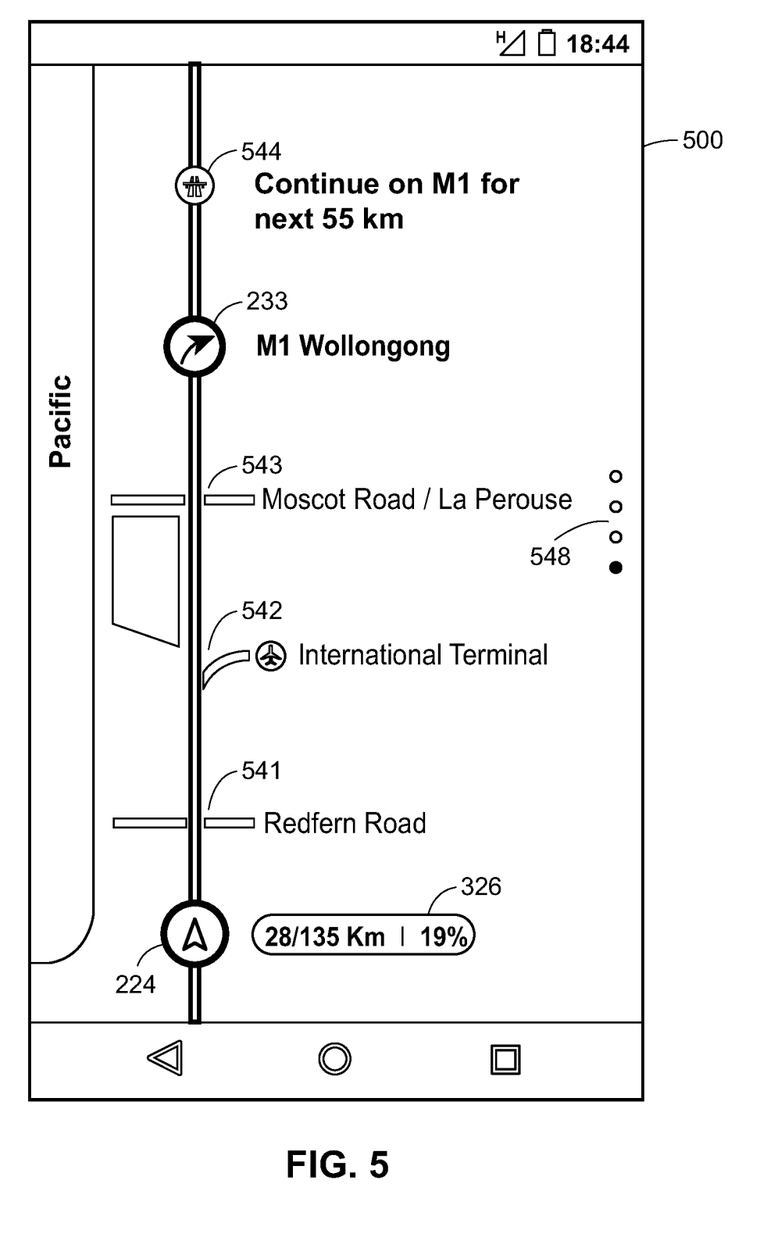
FIG. 5 is an example user interface screen the computing device of FIG. 1 can generate in response to a user activating the interactive control of FIG. 4.

In response to the user actuating the waypoint indicator 233, the linear route visualization modules 132 and/or 154 generate the user interface screen 500 illustrated in FIG. 5. In particular, the user interface screen 500 depicts an expanded linear visualization of the navigation route. The entire initial linear visualization is expanded upon actuating the waypoint indicator 233, according to this implementation. Similar to the initial linear visualization, the expanded linear visualization can include one or more route segment and one or more waypoint indicators corresponding to intermediate geographic locations omitted from the initial linear visualization.

The expanded linear visualization of FIG. 5 includes waypoint indicators 541-543 corresponding to intermediate geographic locations that, although not indicated in the initial linear visualization, are located between the intermediate geographic locations corresponding to the waypoint indicators 232 and 233. The waypoint indicators 541-543 can be generally similar to the waypoint indicators discussed above. Some or all of the waypoint indicators 541-543 can be interactive to allow further expansion of the desired part of the linear visualization, so that the user can access the next level of specificity when inspecting the navigation route. In general, a user can iteratively expand a linear visualization of a navigation route until reaching the tier of atomic route segments can cannot be expanded any further.

In this scenario, the user interface screen 500 fits only a portion of the line 220. An instruction 544, which indicates that the user should continue driving down M1 after passing the geographic location corresponding to the waypoint indicator 233, is displayed near the top of the screen. A control 548 allows the user to reposition the viewing window to inspect other route segments and waypoints.

Figure 6:
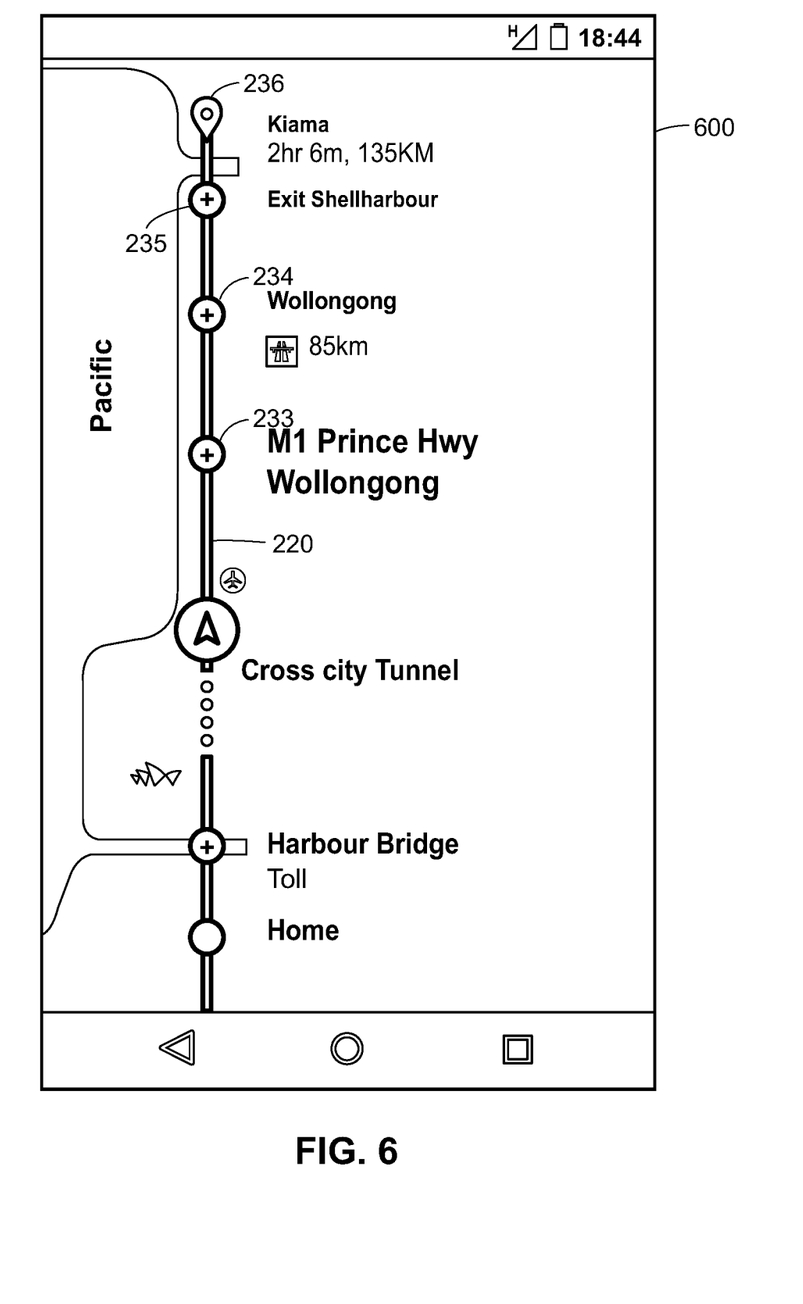
FIG. 6 is an example user interface screen the computing device of FIG. 1 can generate to illustrate the current position of the computing device relative to the intermediate geographic locations depicted as part of the interactive linear visualization.

Now referring to FIG. 6, an example user interface screen 600 is generally similar to the user interface screens discussed above, except that here waypoint indicators corresponding to geographic locations more proximate to the current location of the computing device 112 are visually emphasized relative to the other waypoint indicators. Thus, the font used to label the waypoint indicator 233 is larger than the font of the waypoint indicator 234, which in turn is larger than the font of the waypoint indicator 236, etc. More generally, the linear route visualization modules 132 and/or 154 can use any suitable technique to visually emphasize more proximate items, such as using darker colors to depict more proximate items than the more distance ones, using the "fisheye" perspective to focus on the more proximate items, etc.

Figure 7:
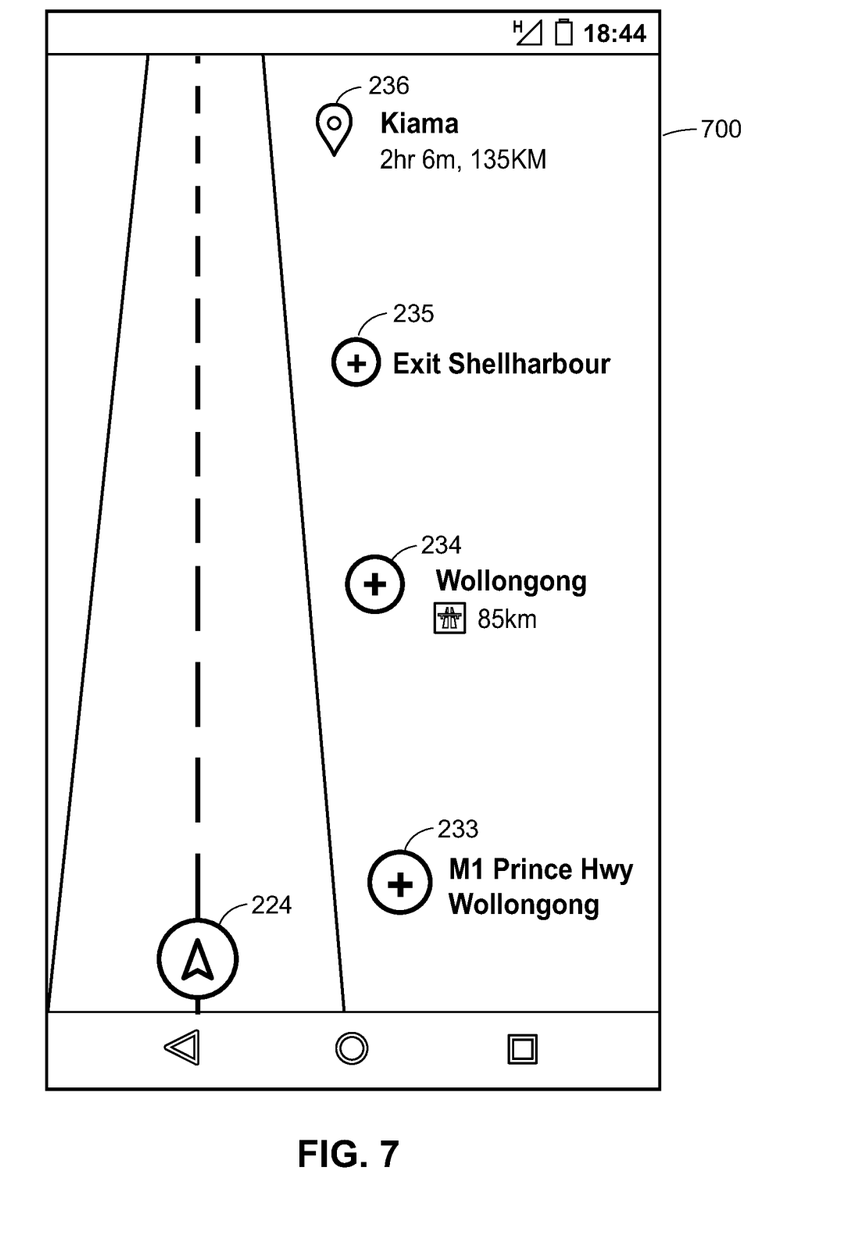
FIG. 7 is an example user interface screen the computing device of FIG. 1 can generate to provide a three-dimensional view of an interactive linear visualization of a navigation route.

In some implementations, a linear visualization of a navigation route can be presented in a three-dimensional view. One such example user interface screen 700 is illustrated in FIG. 7. This user interface screen can include the current location indicator 224 near the bottom of the screen, superimposed on a linear representation of a nonlinear navigation route. The linear representation of the route is depicted on a tilted plane to create a three-dimensional perspective. Waypoint indicators 233-2136 in this example implementation can appear next to the road 720. The size of the waypoint indicators 233-236 can vary to appear larger near the bottom of the screen, so as to be consistent with the three-dimensional perspective. As the computing device 112 advances along the navigation route, waypoint indicators can be removed or added as necessary to update the view. In general, the expansion and "drilling down" techniques discussed above can be applied in a similar manner to the three-dimensional visualization technique of FIG. 7.

Figure 8:
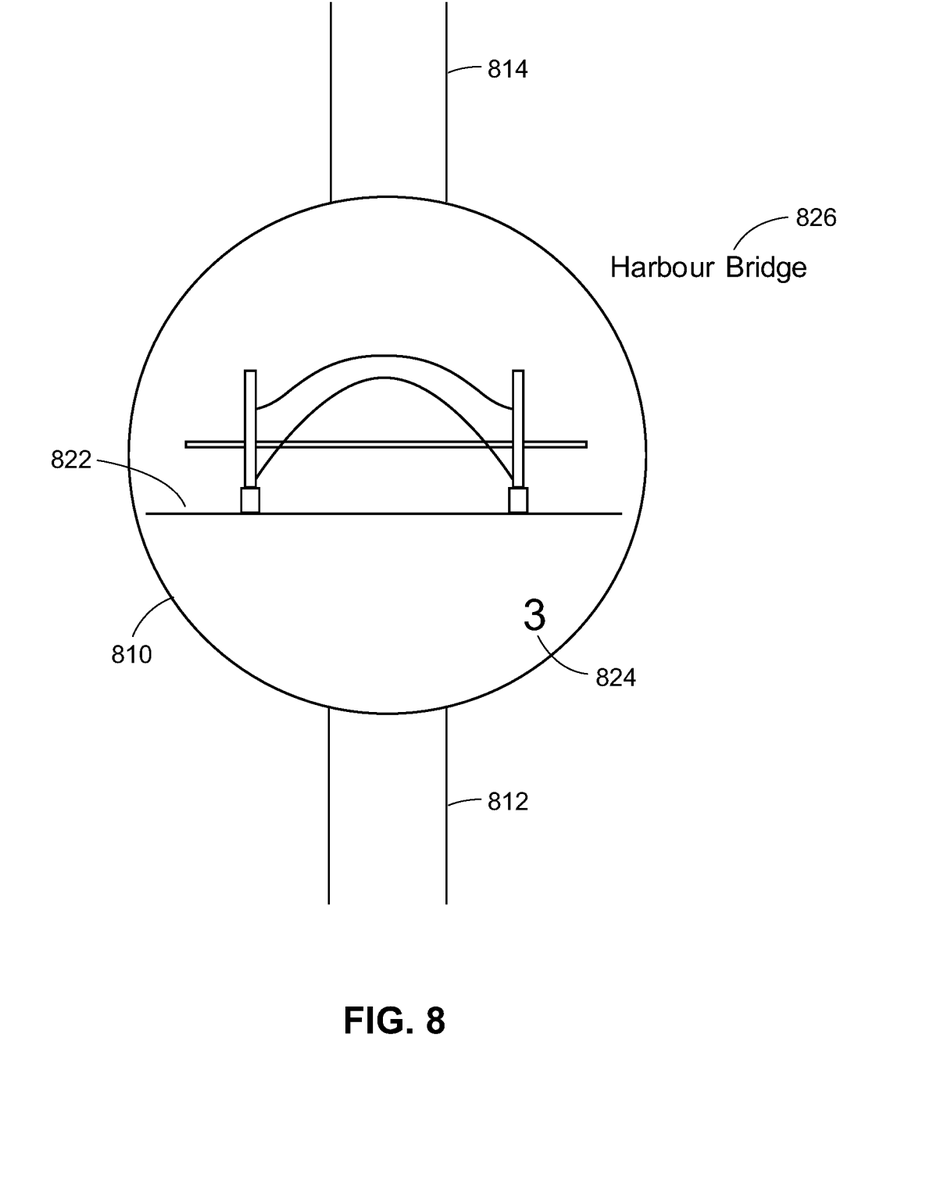
FIG. 8 illustrates an example interactive icon which the computing device of FIG. 1 can provide in an interactive linear visualization of a navigation route.

For further clarity, FIG. 8 illustrates an example interactive icon 810 which can presented as an interactive waypoint indicator in one of the screens discussed above. The interactive icon 810 can include a photographic image 822 selected in accordance with the type of geographic feature corresponding to the waypoint indicator (in this case, a bridge). The interactive icon 810 more generally can include any suitable of information such as a schematic icon or a certain alphanumeric character. Further, an expansion indicator 824 can indicate the number of additional levels of detail available when the linear visualization is expanded or the number of additional route segments in the adjacent segment 812 or 814 that can be viewed upon expansion. Still further, location label 826 identifies the geographic location.

Figure 9A:
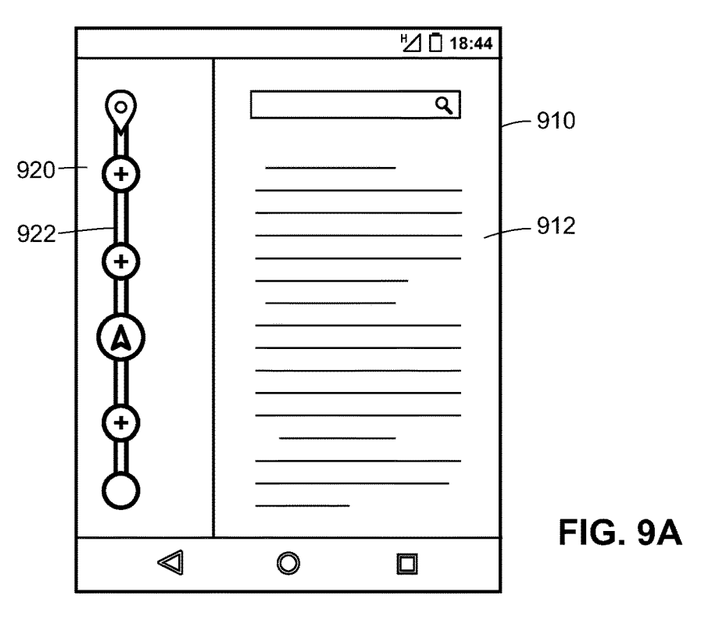
FIGS. 9A-9A are example user interface screens in which an interactive linear visualization and output of a certain software application occupy respective independent panels.
Figure 9B:
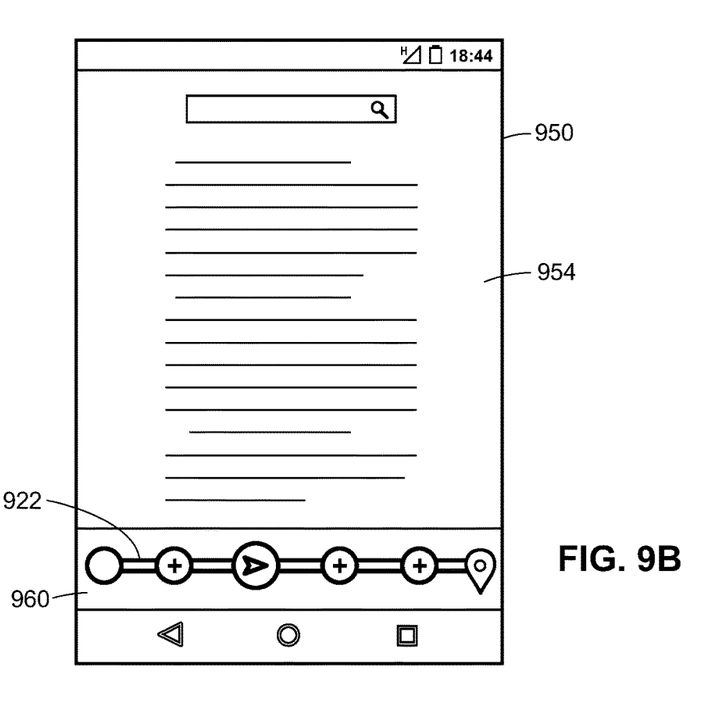

As illustrated in FIGS. 9A and 9B, an interactive linear visualization can advantageously reside in a panel that occupies only a portion of the screen, while output of another software application occupies another portion of the screen. FIG. 9A illustrates an example user interface screen 910 in which a linear visualization 922 of a navigation route resides in a relatively narrow vertical panel 920. Unlike polyline representations of navigation routes, the linear visualization 922 requires little width and allows another application (in this example, a web browser) to occupy a significantly larger panel 912. Each of the panels 920 and 912 can receive user input, display output, and in general operate independently of the other panel. In a generally similar manner, in a user interface screen 950 of FIG. 9B, the linear visualization 922 also can reside in a panel 960 disposed near a bottom of a screen, while another software application occupies an upper panel 954.

In other implementations, the an interactive linear visualization can be disposed in panels of other shapes. For example, a round screen of smartwatch can include a relatively narrow circular panel in which a visualization of a navigation route along an arc can be presented, while another circular panel can include other content. Referring back to FIG. 2, for example, the line 220 in this implementation can be "bent" into an arc. In this implementation, the panels can be disposed relative to each other as concentric circles.

Figure 10:
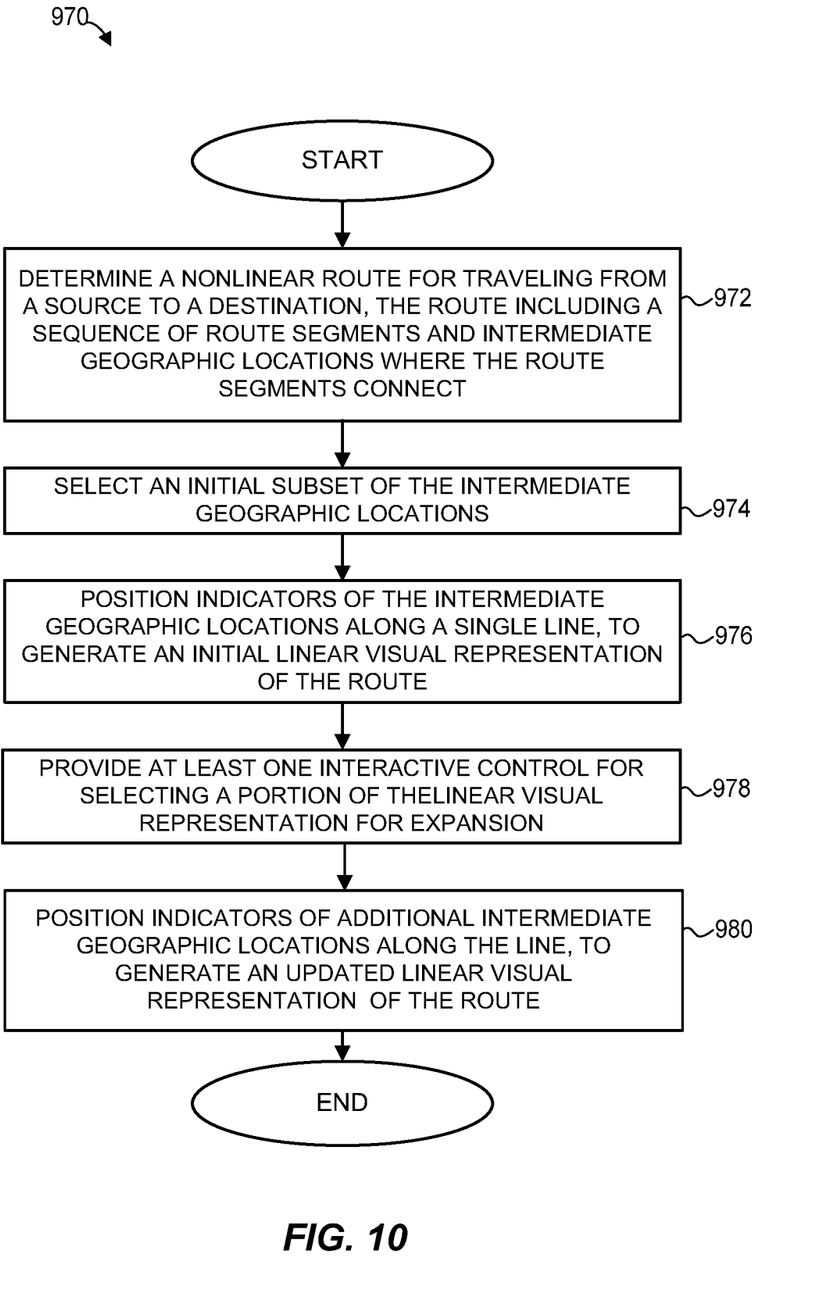
FIG. 10 is a flow diagram of an example method for generating an interactive linear visualization of a navigation route.

Example Method for Generating an Interactive Linear Visualization of a Navigation Route Now referring to FIG. 10, an example method 970 for generating an interactive linear visualization of a navigation route can be implemented in the linear route visualization module 154 and/or the linear route visualization module 132, for example. The method 970 can be implemented as a set of instructions stored on a non-transitory computer-readable medium and executable by one or more processors.

The method 970 begins at block 972, where a nonlinear route for traveling from a source to a destination is determined. The nonlinear route is made up of a sequence of route segments and intermediate geographic locations or waypoints at which the route segments meet. The geometry which these route segments and waypoints define can be a polyline. Depending on the implementation, the nonlinear route can be determined at a network server or at a client computing device (e.g., the computing device 112) using cached or otherwise locally stored map data.

At block 974, an initial subset of the intermediate geographic locations is selected for initial presentation. To select the initial subset, a polyline decimation algorithm can be applied to simplify the polyline. Further, as discussed above, waypoints can be selected from the larger initial set in view of such factors as the types of roads being connected by the maneuver at the waypoint (e.g., highway/highway, local road/highway), the lengths of the road segments connected at the waypoint, the prominence of the geographic feature corresponding to the waypoint (e.g., a distinctive building, a bridge, a monument, a natural feature such as a rock), the estimated degree of familiarity of the user with the corresponding geographic area, etc.

Next, at block 976, indicators of the selected intermediate geographic locations, or waypoint indicators, are disposed along a single line to generate an initial linear visualization of the navigation route. One or more interactive user controls for expanding the entire linear visualization or a selected portion of the linear visualization is provided. As discussed above, these controls can be explicit (e.g., buttons) or implicit (e.g., interactive icons that can be actuated by gestures).

In response to one of these controls being actuated, an expanded linear visualization of the navigation route can be generated at block 980. More particularly, one or more intermediate geographic locations omitted from the initial linear visualization can be added at the appropriate locations.

Additional Considerations

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a cloud computing environment or as a software as a service (SaaS). For example, at least some of the operations may be performed by a group of computers (as examples of machines including processors), these operations being accessible via a network (e.g., the Internet) and via one or more appropriate interfaces (e.g., application program interfaces (APIs).)

Upon reading this disclosure, those of skill in the art will appreciate still additional alternative structural and functional designs for generating a linear visual representation of a navigation route through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims. Accordingly, the appearances of the phrase "in one embodiment" in various places in the specification are not necessarily all referring to the same embodiment.

What is claimed is:

1. A method for generating interactive representations of navigation routes, the method comprising:
   determining, by one or more processors, a nonlinear route for traveling from a source to a destination, the route including a sequence of (i) route segments and (ii) intermediate geographic locations defining endpoints of the route segments;
   generating, by one or more processors, an initial linear visual representation of the route, including:
      selecting an initial subset of the intermediate geographic locations, the initial subset not including at least one of the intermediate geographic locations in the sequence,
      positioning indicators of the intermediate geographic locations along a single line to generate multiple segments of the line between corresponding pairs of the indicators,
      for each of the segments of the line, providing a respective interactive control which, when activated, generates an expanded linear visual representation of only the corresponding segment of the route, wherein the expanded linear visual representation includes at least one of the intermediate geographic locations not selected for the initial linear visual representation, each interactive control including at least one of the indicators of the intermediate geographic locations or one of the segments, individually selectable via tapping or clicking; and
   displaying the linear representation of the route via a user interface of a computing device.

2. The method of claim 1, wherein generating the initial linear visual representation includes applying a polyline decimation algorithm to the nonlinear route to generate a simplified nonlinear route, wherein the initial subset of the sequence of intermediate geographic locations corresponds to endpoints of segments of the simplified nonlinear route.

3. The method of claim 1, wherein selecting the initial subset of the intermediate geographic locations includes selecting the intermediate geographic locations connecting road segments corresponding to roads of different types.

4. The method of claim 1, wherein selecting the initial subset of the intermediate geographic locations includes selecting the intermediate geographic locations in view of their prominence.

5. The method of claim 1, wherein selecting the initial subset of the intermediate geographic locations includes selecting the intermediate geographic locations in view of lengths of road segments which the intermediate geographic locations connect.

6. The method of claim 1, wherein selecting the initial subset of the intermediate geographic locations includes selecting the intermediate geographic locations in view of a metric of user familiarity with geographic areas traversed by the corresponding route segments.

7. The method of claim 1, wherein positioning the indicators includes selecting an icon corresponding to a type of the intermediate geographic location, for display as a part of the linear representation of the route.

8. The method of claim 1, wherein positioning the indicators includes selecting a representative photograph of the intermediate geographic location, for display as a part of the linear representation of the route.

9. The method of claim 1, wherein positioning the indicators of the intermediate geographic locations along the single line includes spacing the indicators apart in proportion to distances between the corresponding geographic locations.

10. The method of claim 1, wherein positioning the indicators of the intermediate geographic locations along a single line includes generating larger indicators for the geographic locations more proximate to a current location of the computing device to produce a three-dimensional perspective.

11. The method of claim 1, further comprising:
    determining a current location of the computing device; and
    displaying an indicator of the current location of the computing device on the initial linear visual representation.

12. The method of claim 11, further comprising visually emphasizing an indicator corresponding to the intermediate geographic location which the computing device is approaching.

13. The method of claim 1, wherein displaying the linear representation of the route via the user interface includes:
    contemporaneously providing a first panel and a second panel via the user interface of the computing device, wherein each of the first panel and the second panel receives user input and displays output independently of the other panel;
    providing the linear representation of the route within the first panel, by a first software application; and
    providing output of a second software application within the second panel.

14. A portable computing device comprising:
    a user interface; and
    processing hardware configured to:
       obtain a nonlinear route for traveling from a source to a destination, the route including a sequence of (i) route segments and (ii) intermediate geographic locations defining endpoints of the route segments,
       generate an initial linear visual representation of the route, including:
          obtain an initial subset of the intermediate geographic locations, the initial subset not including at least one of the intermediate geographic locations in the sequence,
          position indicators of the intermediate geographic locations along a single line to generate multiple segments of the line between corresponding pairs of the indicators,
          for each of the segments of the line, provide a respective interactive control which, when activated, generates an expanded linear visual representation of only the corresponding segment of the route, wherein the expanded linear visual representation includes at least one of the intermediate geographic locations not selected for the initial linear visual representation, each interactive control including at least one of the indicators of the intermediate geographic locations or one of the segments, individually selectable via tapping or clicking; and
       display the linear representation of the route via the user interface.

15. The portable computing device of claim 14, wherein to generate the initial linear visual representation, the processing hardware is configured to apply a polyline decimation algorithm to the nonlinear route to generate a simplified nonlinear route, wherein the initial subset of the sequence of intermediate geographic locations corresponds to endpoints of segments of the simplified nonlinear route.

16. A non-transitory computer-readable memory storing thereon instructions that, when executed by one or more processors, cause the one or more processors to:
obtain a nonlinear route for traveling from a source to a destination, the route including a sequence of (i) route segments and (ii) intermediate geographic locations defining endpoints of the route segments;
generate an initial linear visual representation of the route, including:
obtain an initial subset of the intermediate geographic locations, the initial subset not including at least one of the intermediate geographic locations in the sequence,
position indicators of the intermediate geographic locations along a single line to generate multiple segments of the line between corresponding pairs of the indicators, and
for each of the segments of the line, provide a respective interactive control which, when activated, generates an expanded linear visual representation of only the corresponding segment of the route, wherein the expanded linear visual representation includes at least one of the intermediate geographic locations not selected for the initial linear visual representation, each interactive control including at least one of the indicators of the intermediate geographic locations or one of the segments, individually selectable via tapping or clicking; and
display the linear representation of the route via the user interface.

17. The non-transitory computer-readable memory of claim 16, wherein to generate the initial linear representation, the instructions further cause the one or more processors to:
apply a polyline decimation algorithm to the nonlinear route to generate a simplified nonlinear route, wherein the initial subset of the sequence of intermediate geographic locations corresponds to endpoints of segments of the simplified nonlinear route.

18. The non-transitory computer-readable memory of claim 16, wherein to select the initial subset of the intermediate geographic locations, the instructions cause the one or more processors to select the intermediate geographic locations connecting road segments corresponding to roads of different types.

19. The non-transitory computer-readable memory of claim 16, wherein to select the initial subset of the intermediate geographic locations, the instructions cause the one or more processors to select the intermediate geographic locations in view of their prominence.

20. The non-transitory computer-readable memory of claim 16, wherein to select the initial subset of the intermediate geographic locations, the instructions cause the one or more processors to select the intermediate geographic locations in view of lengths of road segments which the intermediate geographic locations connect.

* * * * *